United States Patent [19]

Alander

[11] 4,444,525
[45] Apr. 24, 1984

[54] JOINT FOR DOOR FRAMES AND OTHER SIMILAR SECTIONS

[76] Inventor: Kaarina Alander, Larin Kyostintie 13 C 7, 00650 Helsinki 65, Finland

[21] Appl. No.: 314,087
[22] PCT Filed: Feb. 20, 1981
[86] PCT No.: PCT/FI81/00011
§ 371 Date: Oct. 8, 1981
§ 102(e) Date: Oct. 8, 1981
[87] PCT Pub. No.: WO81/02440
PCT Pub. Date: Sep. 3, 1981

[30] Foreign Application Priority Data

Feb. 21, 1980 [FI] Finland ................................. 800514

[51] Int. Cl.³ .......................... B25G 3/36; E04G 7/00
[52] U.S. Cl. .................................. 403/402; 403/405;
160/381; 411/466; 52/656
[58] Field of Search ............... 403/402, 401, 405, 280,
403/283, 141; 52/475, 476, 656, 657, DIG. 6;
411/466; 160/381

[56] References Cited

U.S. PATENT DOCUMENTS

| | | | |
|---|---|---|---|
| 754,215 | 3/1904 | Hayward | 52/DIG. 6 |
| 1,209,032 | 12/1916 | Richens | 403/402 |
| 1,334,553 | 3/1920 | Richens | 403/402 |
| 1,663,580 | 3/1928 | Andersin | 403/405 |
| 1,779,729 | 10/1930 | Bruce | 52/582 |
| 1,920,276 | 8/1933 | Richens | 403/278 |
| 2,101,349 | 12/1937 | Sharp | 52/657 |
| 2,170,462 | 8/1939 | Putnam | 52/DIG. 6 |
| 2,857,635 | 10/1958 | Maple | 411/466 X |

*Primary Examiner*—Wayne L. Shedd
*Attorney, Agent, or Firm*—McGlew and Tuttle

[57] ABSTRACT

Joint for door frames or similar frame structures or sections, like window casements and frames, picture frames, etc. in which the sections that are to be jointed form an angle with each other or a direct extension to each other. On the outer or inner surfaces of these sections has been made an incision or a groove wherein a junction plate made of metal has been inserted. The junction plate is either corrugated, jagged, or toothed, whereby the effective thickness of the junction plate is made bigger or larger than the width of the groove in these sections, and such that the pressing of the junction plate into the groove causes it to be fixed in position. The inner edge of the junction plate, at least partly, comprises toothing or teeth, the teeth being pressed into the bottom of the groove at the end of the jointing.

2 Claims, 5 Drawing Figures

4,444,525

JOINT FOR DOOR FRAMES AND OTHER SIMILAR SECTIONS

FIELD AND BACKGROUND OF THE INVENTION

The object of the present invention is a joint for door frames and other similar frame structures or sections. These include, among others, window casements and frames, picture frames, etc. The invention is preferably applied to jointing frames or the like, made of wood, but it is also fit for jointing parts or sections made of other materials, for instance plastic.

Door frames, casements, and other similar structures or sections are nowadays generally manufactured in ready-made elements by sash and door factories or carpenters' workshops, and then mounted in their respective positions at buildings sites. The highly developed standardisation of doors and windows had made it possible to produce them in large series. The frames and casements produced in series are manufactured using traditional carpenter's joints, the so-called claw joints; these require the use of special routers and are comparatively laborious to produce. Thus it is usually possible to manufacture the joints only industrially.

On the other hand, the transportation of ready-made casements and frames is uneconomical, since they take up a relatively large space.

Corner joints for frames with junction plates or bracings of metal are previously known. U.S. Pat. No. 1,334,553 and German Pat. No. 816,749 can be referred to as examples. These introduce joints, in which junction plates of metal are placed in a groove in the frame. The junction plates have been attached to the frames by nailing. In the U.S. patent they are nailed on either the inner or the outer surface of the frame, and in the German patent on the lateral surface of the frame.

U.S. Pat. No. 1,392,070, gives a junction of plate of metal, which is attached to the frame with die-cut teeth. A similar solution is also given in Swedish patent application No. 1773/71 A drawback of the solutions presented above is the awkwardness and slowness of their use. This is due to the difficulty of using nails or the complicated pressure devices needed. Moreover, nails are not desirable on the surface of the frame.

U.S. Pat. No. 1,959,360 discloses a nail for a corner joint. The nail has a flat body with an arrowheaded tongue in one end and a V-shaped groove in the opposite end. Along the sides of the flat body, the nail is provided with flanges which diverge from the arrowheaded end to the grooved end. The sections of wood to be jointed are mitered and grooves are cut on the respective positions within the mitered edges to serve as guides for the nail. When the nail is pressed, the V-shaped end moves ahead, i.e. from the outer corner into the groove of the corner joint, and the flanges bite into the walls of the groove and draw the sections tightly together. The length of the nail is prechosen so that it extends through the whole corner joint.

Two drawbacks can be mentioned in connection with the above-described nail. The flanges of the nail may split the wood along the groove of the sections of the frame especially if these sections are made of hard wood. The nail should be as long as the mitered edges of the sections. Hence, the nail which can be used depends on the breadth of the sections of the frame.

In U.S. Pat. No. 1,779,729 is described a nail with a corrugated body plate. The nail is used for securing together strips of wood which form a block in making parquetry. The strips are jointed together along their longitudinal edges by tongue and groove portions. Furthermore, the strips are provided with end grooves for jointing crosswise an adjacent block with them. The parallel strips are secured together with the nails at the opposite ends of the strips. Each nail is driven into the wood along the grain in the end groove until it is flush with the bottom of the groove.

The purpose of the corrugation in the body plate according to U.S. Pat. No. 1,779,729 is to make the nail rigid and to prevent it from splitting the wood when the whole nail is driven deeply inside the strips of wood. Nevertheless, the nail may still split the wood, especially if the strips are made of hard wood.

U.S. Pat. No. 1,663,580 describes a fastener for fastening together two pieces of wood, for instance, in the manufacture of boxes. The fastener comprises a round corrugated metal plate adapted to be inserted into semicircular grooves cut into the joining faces of the pieces of wood to be fastened together. Tongues are provided which project from the plane of said metal plate and are adapted to bite into the wood upon a turning of said metal plate in the groove.

The turning of the metal plate according to U.S. Pat. No. 1,663,580 requires a special key for insertion into a hole in the middle of the metal plate and through a hole which has to be provided in the joining faces of the two pieces of wood. The metal plate must not fit very closely within the grooves so as not to render difficult its turning. However, consequently, the metal plate can give only limited resistance against forces exerted onto the joint. Furthermore, the cutting of the semi-circular grooves into the joining faces is laborious.

SUMMARY OF THE INVENTION

The above explained drawbacks can be avoided by using a joint according to the present invention, the characteristic features of which are given in the patent claims.

It is an object of this invention to provide a joint for door frames or similar sections which can be easily assembled without special tools at the building site, which is inherently reliable and can be used with different sizes of frames or similar sections.

One of the advantages of a joint according to the invention is that the frames can be assembled without special tools or machines. The transportation of the elements is easy and does not require a lot of space, since the assemblage can be carried out at the building site. Frame and casements of different sizes are easy to produce beforehand, due to the fact that the same junction plates can be used in assemblying them.

BRIEF DESCRIPTION OF THE DRAWING

In the following the invention is explained in detail with reference to the accompanying drawings.

FIG. 4 shows a section IV—IV of the junction plate in

FIG. 3,

DESCRIPTION OF THE PREFERRED EMBODIMENTS

Figure 1:
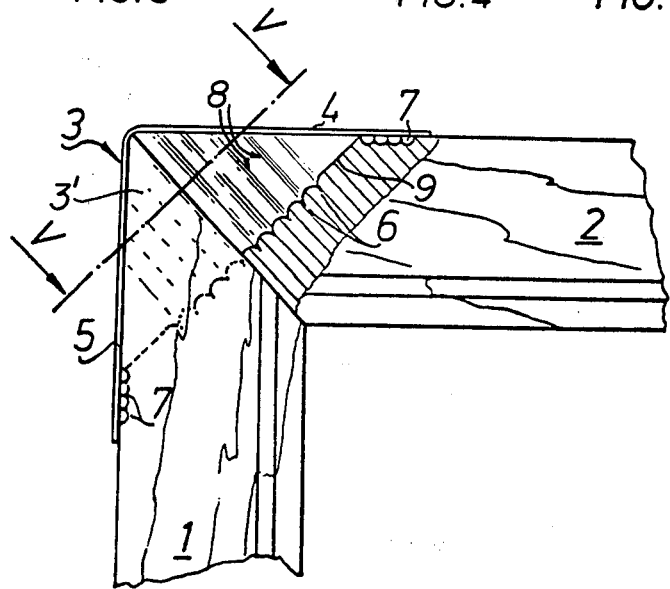
FIG. 1 shows one advantageous application of the invention.
Figure 6:
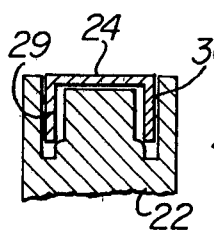
FIG. 6 shows a section VI—VI of FIG. 2.

According to FIG. 1 the ends of the horizontal and vertical parts or sections 1 and 2 of the frame are slanted at 45° angles. Parts 1 and 2 are joined together or jointed using junction plate 3 constructed according to the invention. The junction plate 3 is made of a metal plate by bending it in order to produce two flanges or arms 4 and 5, or other similar planes, which are at right angles to each other. The sheet metal insertion portion 3' is connected at right angles to the flanges or planes 4 and 5, and said planes 4 and 5 are placed against the outer edges of the frame parts 1 and 2, i.e. as external arms. For the junction plate 3, or more specifically for its sheet metal insertion portion 3' a groove 51 has been made in the frame. The junction plate is corrugated, or more specifically the sheet metal insertion portion 3' thereof is provided with the corrugations as at 8, forming engaging portions for engaging the adjacent side portions of the groove 51, so that it can be inserted into the said groove 51 only by pressing. To provide an additional fastening effect the inner edge 9 of the sheet metal insertion portion 3' of the junction plate comprises teeth 6, which are pressed into the wood. The flanges or arms 4 and 5 are respectively provided with corresponding external knobs or protrusions 7.

Figure 2:
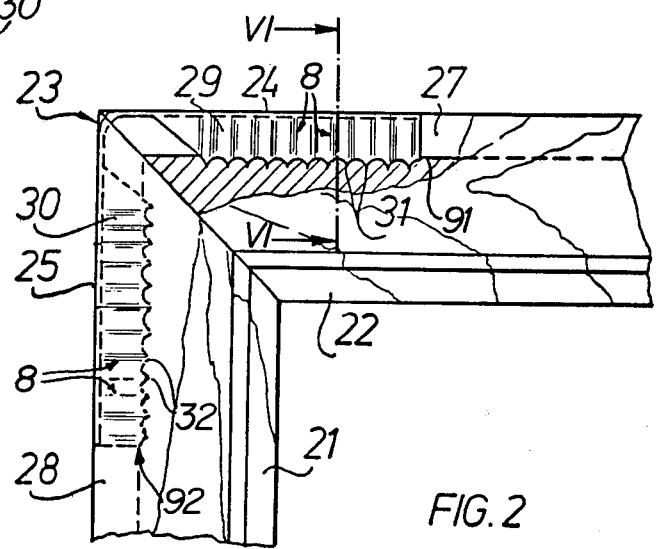
FIG. 2 shows another possible application of the invention.

FIG. 2 shows another advantageous application of the present invention. In this case the vertical and horizontal parts or sections 21 and 22 of the frame are respectively slanted at 45° angles. On the outer surfaces of the frame have been cut two grooves 27 and 28, wherein the junction plate 23 according to the invention is pressed. The junction plate 23 is made e.g. by bending a metal plate or by tooling so as to provide it with a U-shaped or U-profile. The junction plate 23 consists of two arms 24 and 25 at right angles to each other and placed against the outer surfaces of the two parts of the frame, i.e. as external arms. Both arms in effect have a U-shaped cross-section. Then both arms of the U-profile are pressed into the grooves 27 and 28 in the frame. The fastening of the junction plate into the grooves is achieved through similar corrugations 8, forming groove engaging portions, as in FIG. 1. Correspondingly also parts 29 and 30, which may be termed pairs of sheet metal insertion portions of the U-shaped arms, i.e. formed by the sides of the U-shaped junction plate 23 while the arms 24 and 25 are formed in turn by the corresponding intermediate closed end portion of such U-shaped junction plate 23 which interconnects such pairs of sheet metal insertion portions or parts 29 and 30, whereby to form in composite a sheet metal plate or junction plate 23 of corresponding U-shaped cross-section, are provided with teeth 31 and 32, as at their corresponding inner edges 91, 92, which teeth are pressed into the bottoms of the grooves 27 and 28.

Figure 3:
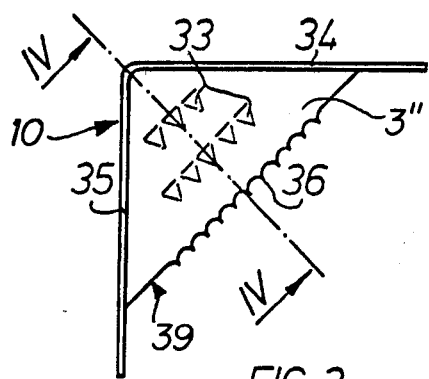
FIG. 3 shows a junction plate according to the invention.
Figure 4:
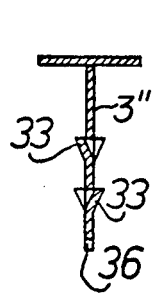
Figure 5:
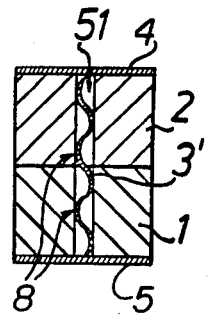
FIG. 5 shows a section V—V of FIG. 1.

FIG. 3 shows another example of a preferable application of the junction plate according to the invention. This junction plate 10 is bent out of a metal plate, and it comprises flanges or arms 34 and 35, i.e. as external arms. The part, i.e. the sheet metal insertion portion 3", to be inserted in the groove of the frame is now provided with a plurality of individual triangular protrusions 33, forming corresponding groove engaging portions, punched out of the sheet-metal insertion portion 3", the shape of which can also be seen in the section in FIG. 4. The inner edge 39 of the junction plate, as at the sheet metal insertion portion 3" also comprises teeth 36, which are pressed into the bottom of the groove in the frame.

I claim:

1. A joint forming arrangement for a door frame, comprising:
    a pair of adjacent frame sections (1,2) arranged to form an angle with each other, each frame section having an outer surface adjacent the angle and at least one junction plate insertion groove (51) extending into each frame section from its outer surface, said grooves of said frame section communicating with each other across the angle;
    a junction plate (3) disposed at least partly in and extending across said grooves;
    said junction plate comprising a sheet metal plate having a pair of arms (4,5) arranged at an angle to each other corresponding to the angle formed between said adjacent frame sections (1,2) and each disposed against said outer surface of one of said frame sections, said junction plate further having at least one sheet metal insertion portion connected to said arms and inserted into said grooves, said insertion portion having a plurality of corrugations (8) engaged in said grooves, said corrugations providing said insert portion with an effective thickness which is greater than a width of said communicating grooves, said insertion portion further having a groove-engaging inner edge pressed into a bottom of said grooves, said inner edge having a plurality of teeth (6) engaging the bottom of said grooves;
    whereby said junction plate forms a joint between said adjacent sections with said sheet metal insertion portion being pressed into said grooves sufficiently to place said arms against said outer surfaces of said adjacent sections and said corrugations into engagement with sides of said grooves as well as teeth at said inner edge of said insertion portion into engagement with the bottom of said grooves.

2. A joint forming arrangement according to claim 1, wherein the angle is a right angle.

* * * * *